(12) United States Patent
Choi et al.

(10) Patent No.: US 11,043,713 B2
(45) Date of Patent: Jun. 22, 2021

(54) BAND ASSEMBLY

(71) Applicant: SAMSUNG SDI CO., LTD., Yongin-si (KR)

(72) Inventors: Sol Choi, Yongin-si (KR); Jandee Kim, Yongin-si (KR); Junggyu Nam, Yongin-si (KR); Bong-Kyoung Park, Yongin-si (KR); Junwon Suh, Yongin-si (KR); Juhee Sohn, Yongin-si (KR); Jungyup Yang, Yongin-si (KR); Jeongdoo Yi, Yongin-si (KR); Juhyeong Han, Yongin-si (KR); Hyunhwa Song, Yongin-si (KR); Hyeri Eom, Yongin-si (KR); Da-Un Han, Yongin-si (KR); Seokhun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 276 days.

(21) Appl. No.: 16/329,181

(22) PCT Filed: Sep. 7, 2016

(86) PCT No.: PCT/KR2016/010033
§ 371 (c)(1),
(2) Date: Feb. 27, 2019

(87) PCT Pub. No.: WO2018/043783
PCT Pub. Date: Mar. 8, 2018

(65) Prior Publication Data
US 2019/0245167 A1    Aug. 8, 2019

(30) Foreign Application Priority Data

Sep. 2, 2016  (KR) .................... 10-2016-0113313

(51) Int. Cl.
*H01M 50/20* (2021.01)
*H01M 10/0587* (2010.01)
(Continued)

(52) U.S. Cl.
CPC ............. *H01M 50/20* (2021.01); *A44C 5/105* (2013.01); *G04G 19/00* (2013.01);
(Continued)

(58) Field of Classification Search
CPC . A44C 5/1085; G01G 19/00; H01M 10/0587; H01M 2220/30; H01M 2/032;
(Continued)

(56) References Cited

U.S. PATENT DOCUMENTS 5,615,179 A     3/1997  Yamamoto et al.
5,695,885 A  *  12/1997  Malhi ................. H01M 50/209
                                                        429/7

(Continued)

FOREIGN PATENT DOCUMENTS

CN     205067975 U    3/2016
CN     105591043 A    5/2016
(Continued)

OTHER PUBLICATIONS

Extended European Search Report for corresponding European Patent Application No. 16915263.4, dated Mar. 19, 2020, 5 pages.
(Continued)

*Primary Examiner* — Adam A Arciero
(74) *Attorney, Agent, or Firm* — Lewis Roca Rothgerber Christie LLP (57) ABSTRACT

The present invention relates to a band assembly including a first outer connecting portion and a second outer connecting portion disposed to face each other, wherein the first outer connecting portion includes a first fastening hole and the second outer connecting portion includes a third fasten-
(Continued)

ing hole, an inner connecting portion disposed between the first outer connecting portion and the second outer connecting portion, wherein the inner connecting portion includes a second fastening hole that corresponds to the first fastening hole and the third fastening hole, and a rechargeable battery inserted into the first fastening hole, the second fastening hole, and the third fastening hole to connect the first outer connecting portion, the inner connecting portion, and the second outer connecting portion.

12 Claims, 11 Drawing Sheets

(51) Int. Cl.
    *H01M 50/172* (2021.01)
    *H01M 50/502* (2021.01)
    *H01M 50/531* (2021.01)
    *H01M 50/543* (2021.01)
    *A44C 5/10* (2006.01)
    *G04G 19/00* (2006.01)

(52) U.S. Cl.
    CPC ..... *H01M 10/0587* (2013.01); *H01M 50/172* (2021.01); *H01M 50/502* (2021.01); *H01M 50/531* (2021.01); *H01M 50/543* (2021.01); *H01M 2220/30* (2013.01)

(58) Field of Classification Search
    CPC .......... H01M 2/027; H01M 2/06; H01M 2/10; H01M 2/1022; H01M 2/1055; H01M 2/204; H01M 2/26; H01M 2/30
    See application file for complete search history.

(56) References Cited

U.S. PATENT DOCUMENTS

| | | | |
|---|---|---|---|
| 6,418,706 | B1 | 7/2002 | Kit |
| 10,849,392 | B1* | 12/2020 | Wittenberg ............ G04C 10/00 |
| 2004/0224223 | A1 | 11/2004 | Sun et al. |
| 2009/0297892 | A1 | 12/2009 | Ijaz et al. |
| 2011/0089903 | A1 | 4/2011 | Heikkinen |
| 2013/0323565 | A1 | 12/2013 | Tucholski |
| 2015/0115870 | A1 | 4/2015 | Vance |
| 2016/0014245 | A1* | 1/2016 | Zaitsev .................. G04B 47/00 455/557 |
| 2016/0094259 | A1* | 3/2016 | Hatanaka ................ G06F 1/163 455/90.2 |
| 2016/0133888 | A1 | 5/2016 | Hartl |
| 2017/0200935 | A1 | 7/2017 | Hong et al. |

FOREIGN PATENT DOCUMENTS

| | | |
|---|---|---|
| CN | 105637696 A | 6/2016 |
| CN | 205406642 U | 7/2016 |
| EP | 1 316 269 A1 | 6/2003 |
| JP | 7-322905 A | 12/1995 |
| JP | 2013-20891 A | 1/2013 |
| KR | 10-2010-0134111 A | 12/2010 |
| KR | 10-1502766 B1 | 3/2015 |

OTHER PUBLICATIONS

Chinese Office Action, with English translation, dated Mar. 23, 2021, issued in corresponding Chinese Patent Application No. 201680089929.3 (10 pages).

* cited by examiner

BAND ASSEMBLY

CROSS-REFERENCE TO RELATED APPLICATION(S)

This application is a National Phase Patent Application and claims priority to and the benefit of International Application Number PCT/KR2016/010033, filed on Sep. 7, 2016, which claims priority to Korean Patent Application Number 10-2016-0113313, filed on Sep. 2, 2016, the entire contents of all of which are incorporated herein by reference.

TECHNICAL FIELD

The present invention relates to a band assembly.

BACKGROUND ART

With recent technological advances in electronic devices, the category of electronic devices is not limited to mobile communication terminals such as smart phones, tablet PCs, and PDAs, and widely includes wearable devices such as a smart watch, a head-mounted display (HMD), and the like.

Among these electronic devices, various products with superior user convenience such as a wrist watch and a smart watch are being developed because there is no inconvenience of carrying them in a pocket or bag or carrying them by hand, and various services such as a diary, a message, a notification, and a stock quote can be easily checked and retrieved wirelessly.

Generally, a power supply battery applied to the smart watch has a limitation in reduction of its size and thus should be stored in an area where an image is displayed, and as a result, capacity of the battery is limited, so the battery should be frequently charged if the smart watch is used for a long time.

DISCLOSURE

Technical Problem

The present disclosure has been made in an effort to provide a band assembly that is capable of enhancing a user convenience.

Technical Solution

An exemplary embodiment of the present invention provides a band assembly including a first outer connecting portion and a second outer connecting portion disposed to face each other, wherein the first outer connecting portion includes a first fastening hole and the second outer connecting portion includes a third fastening hole, an inner connecting portion disposed between the first outer connecting portion and the second outer connecting portion, wherein the inner connecting portion includes a second fastening hole that corresponds to the first fastening hole and the third fastening hole; and a rechargeable battery inserted into the first fastening hole, the second fastening hole, and the third fastening hole to connect the first outer connecting portion, the inner connecting portion, and the second outer connecting portion.

The rechargeable battery may include an electrode assembly in which a first electrode and a second electrode are wound while interposing a separator therebetween, a case configured to accommodate the electrode assembly, wherein the case is electrically connected to the second electrode, and a center pin disposed at a center of the electrode assembly, wherein the center pin includes an electrode terminal, and the electrode terminal is electrically connected to the first electrode and protrudes out of the case.

The band assembly may include a plurality of rechargeable batteries, and the band assembly may include a first electrode connecting portion and a second electrode connecting portion that electrically connect each rechargeable battery to a neighboring rechargeable battery.

The first electrode connecting portion may include a first sub-connecting portion disposed on an inner surface of the first outer connecting portion, a second sub-connecting portion disposed on an inner surface of the inner connecting portion, and a third sub-connecting portion disposed on an outer surface of the rechargeable battery, wherein the third sub-connecting portion electrically connects the first sub-connecting portion and the second sub-connecting portion.

The third sub-connecting portion may have a bent shape, and may directly contact some of a surface of the case opposite to a surface thereof where the electrode terminal is disposed.

The second electrode connecting portion may include a fourth sub-connecting portion disposed on an inner surface of the second outer connecting portion, a fifth sub-connecting portion disposed on an inner surface of the inner connecting portion, and a sixth sub-connecting portion disposed on an outer surface of the rechargeable battery, where the sixth sub-connecting portion electrically connects the fourth sub-connecting portion and the fifth sub-connecting portion.

The sixth sub-connecting portion may have a bent shape, and may directly contact at least some of the electrode terminal.

At least one of the first outer connecting portion and the second outer connecting portion may include a first support portion that protrudes toward the rechargeable battery from at least one of inner surfaces facing the rechargeable battery.

The inner connecting portion may include a second support portion that protrudes toward a side wall of the rechargeable battery from at least one of inner surfaces facing the side wall of the rechargeable battery.

The rechargeable battery may include a plate including a first insulating member, wherein the first insulating member is interposed between the plate and an opening of the case, closes and seals the opening of the case, and electrically separates the electrode terminal from the case.

In this case, the rechargeable battery may include a second insulating member configured to enclose the side wall of the case and a top surface of the plate.

In addition, the electrode terminal and the center pin may be integrally formed.

Advantageous Effects

The band assembly according to the present disclosure can improve a service life of the battery, so it is very user friendly when applied to a smart watch.

MODE FOR INVENTION

Hereinafter, various embodiments of the present disclosure will be described in detail with reference to the accompanying drawings so that those skilled in the art can easily carry out the present disclosure. The present disclosure may be embodied in many different ways, and is not limited to the embodiments described herein.

In order to clearly illustrate the present disclosure, parts not related to the description are omitted, and the same reference numerals are used for the same or similar elements throughout the specification.

In addition, the size and thickness of each element shown in the drawings are arbitrarily shown for convenience of explanation, and therefore the present disclosure is not necessarily limited to those shown in the drawings.

In addition, unless explicitly described to the contrary, the word "comprise" and variations such as "comprises" or "comprising" will be understood to imply the inclusion of stated elements but not the exclusion of any other elements.

Figure 1:
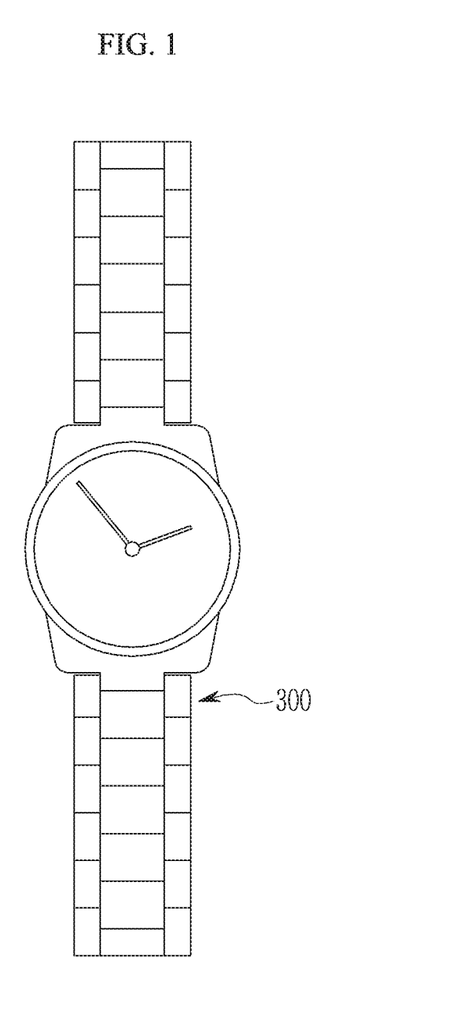
FIG. 1 exemplarily shows a smartwatch to which a band assembly according to an exemplary embodiment of the present disclosure is applied.
Figure 2:
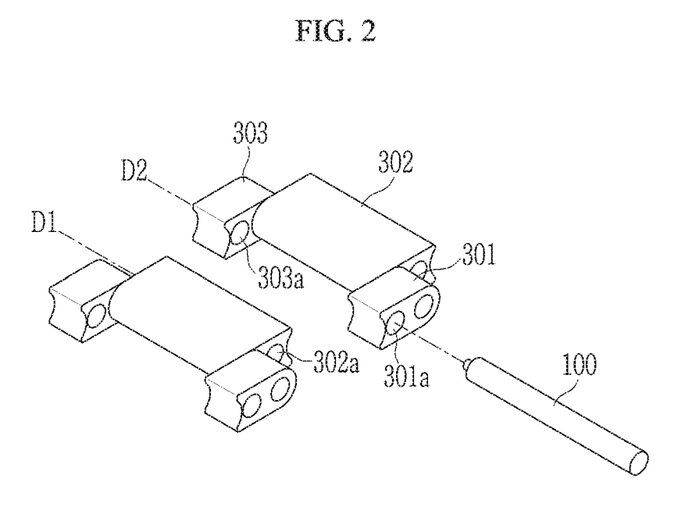
FIG. 2 is an exploded schematic perspective view of a part to which a band assembly according to an exemplary embodiment of the present disclosure is connected.

FIG. 1 exemplarily shows a smartwatch to which a band assembly according to an exemplary embodiment of the present disclosure is applied, and FIG. 2 is an exploded schematic perspective view of a part to which a band assembly according to an exemplary embodiment of the present disclosure is connected.

Referring to FIGS. 1 and 2, a band assembly 300 according to the current exemplary embodiment of the present disclosure includes a first outer connecting portion 301 and a second outer connecting portion 303 that are disposed to face each other, and an inner connecting portion 302 that is disposed between the first outer connecting portion 301 and the second outer connecting portion 303.

The first outer connecting portion 301 and the second outer connecting portion 303 are disposed to face each other, and respectively include a first fastening hole 301a and a third fastening hole 303a. In addition, the inner connecting portion 302 includes a second fastening hole 302a, the size and position of which correspond to those of the first fastening hole 301a and the third fastening hole 303a.

The band assembly 300 includes a rechargeable battery 100 that is inserted into the first fastening hole 301a, the third fastening hole 303a, and the second fastening hole 302a to connect the first outer connecting portion 301, the second outer connecting portion 303, and the inner connecting portion 302.

More specifically, in the band assembly 300, the first outer connecting portion 301 and the second outer connecting portion 303 are respectively disposed at one side and the other side of the inner connecting portion 302 such that central axes D2 of the first fastening hole 301a and the third fastening hole 303a are aligned to a central axis D1 of the second fastening hole 302a.

The rechargeable battery 100 is inserted into the first fastening hole 301a that is formed in the first outer connecting portion 301 disposed at one side of the inner connecting portion 302, passes through the second fastening hole 302a that is formed in the inner connecting portion 302, and is then inserted into the third fastening hole 303a that is formed in the second outer connecting portion 303 disposed at the other side of the inner connecting portion 302.

In the band assembly 300 according to the present disclosure, since the rechargeable battery 100 can be, as described above, easily inserted and removed through the first fastening hole 301a, the third fastening hole 303a, and the second fastening hole 302a, the rechargeable battery 100 has a merit in that some of the plurality of rechargeable batteries 100 that are defective or go dead during use of the band assembly 300 can be easily replaced.

Figure 3:
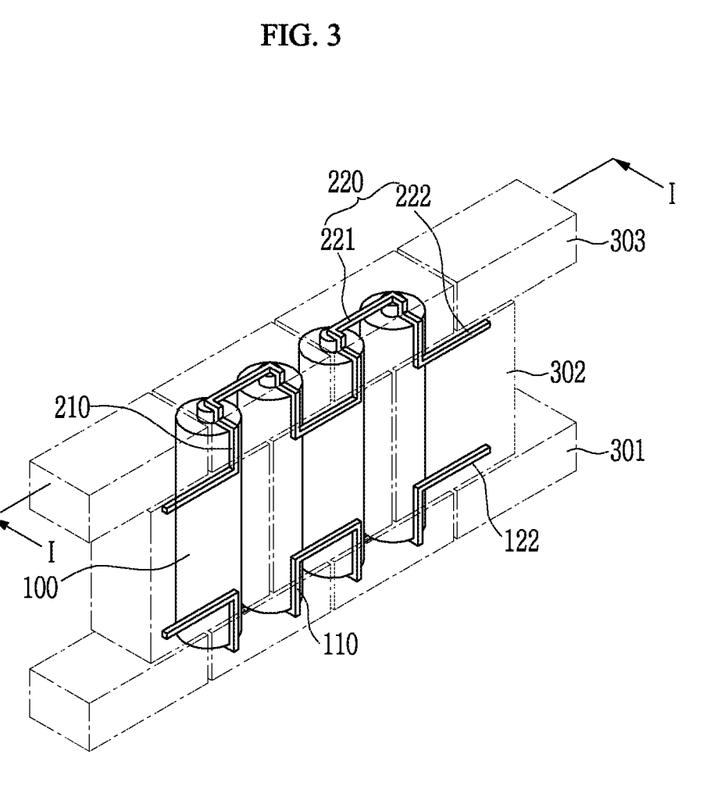
FIG. 3 is a schematic view of an internal connection structure of a part of a band assembly according to an exemplary embodiment of the present disclosure.
Figure 4:
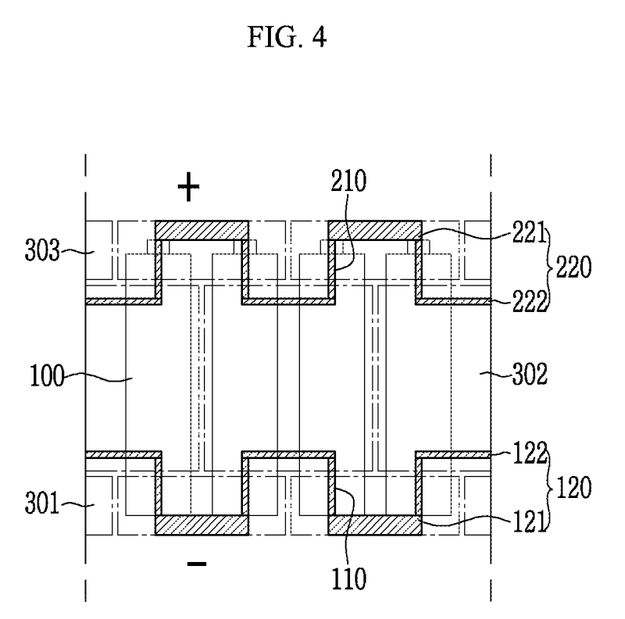
FIG. 4 is a partial cross-sectional view of FIG. 3 taken along the line I-I.

FIG. 3 schematically shows an interconnection structure part of a band assembly according to an exemplary embodiment of the present disclosure, and FIG. 4 is a partial cross-sectional view of FIG. 3 taken along the line I-I.

In FIGS. 3 and 4, for better understanding, the first outer connecting portion 301, the second outer connecting portion 303, and the inner connecting portion 302 are indicated by dotted lines, and elements positioned inside of them are indicated by solid lines.

Referring to FIGS. 3 and 4, the band assembly 300 according to an exemplary embodiment of the present disclosure may include a plurality of rechargeable batteries 100.

As described above, since the band assembly 300 includes the plurality of rechargeable batteries, when applied to a smart watch or the like, the battery's lifetime may be dramatically improved when compared to a case where a battery is included only in an area where an image of a smart watch is displayed as in the prior art.

The band assembly 300 may include a first electrode connecting portion 120 and a second electrode connecting portion 220 that electrically connect each rechargeable battery 100 to a neighboring rechargeable battery 100.

The first electrode connecting portion 120 may include a first sub-connecting portion 121, a second sub-connecting portion 122, and a third sub-connecting portion 110.

The first sub-connecting portion 121 may be disposed on an inner surface of the first outer connecting portion 301. Specifically, the first sub-connecting portion 121 may be disposed at one of inner surfaces of the first outer connecting portion 301a that faces a bottom surface of the case of the rechargeable battery 100.

In addition, the second sub-connecting portion 122 may be disposed on the inner surface of the inner connecting portion 302. Specifically, the second sub-connecting portion 122 may be disposed on one of inner surfaces of the inner connecting portion 302 that face a side wall of the rechargeable battery 100.

The first sub-connecting portion 121 and the second sub-connecting portion 122 may be, for example, linearly formed, and preferably, they may be arranged in parallel with each other. In terms of efficiency, the first sub-connecting portion 121 and the second sub-connecting portion 122 may be disposed such that a distance therebetween is the shortest.

However, this is only an example, and the shape and thickness of the first sub-connecting portion 121 and the second sub-connecting portion 122 are not specifically limited as long as the first sub-connecting portion 121 and the second sub-connecting portion 122 can be electrically connected through the third sub-connecting portion 110 to be described below. Therefore, they may also be, for example, formed in the shape of a curve, a zigzag-shaped line, or a mixture thereof.

A thickness of the first sub-connecting portion 121 may be the same as that of the second sub-connecting portion 122, and the thickness of the first sub-connecting portion 121 may be smaller than that of the second sub-connecting portion 122, and as shown in FIG. 4, the thickness of the first sub-connecting portion 121 may be greater than that of the second sub-connecting portion 122.

That is, the thickness of the first sub-connecting portion 121 may vary depending on a height of the rechargeable battery 100 that is disposed inside the outer connecting portions 301 and 303 and the inner connection portion 303, but it is not specifically limited thereto.

The third sub-connecting portion 110 is disposed on an outer surface of the case of the rechargeable battery 100, and serves to electrically connect the first sub-connecting portion 121 and the second sub-connecting portion 122.

Specifically, the third sub-connecting portion 110 is disposed to contact a bottom surface of the case of the rechargeable battery 100, that is, to at least partially contact a surface of the case opposite to the surface thereof where the electrode terminal is disposed. The third sub-connecting portion 110 may be formed to be bent along an outer shape of the rechargeable battery 100.

The widths, thicknesses, shapes, and the like of the first sub-connecting portion 121, the second sub-connecting portion 122, and the third sub-connecting portion 110 are not specifically limited, and they may be freely modified as long as they are electrically connected to each other.

In addition, the first sub-connecting portion 121, the second sub-connecting portion 122, and the third sub-connecting portion 110 may be made of a material having electrical conductivity, and for example, may be formed of the same material as the case of the rechargeable battery 100, but they are not limited thereto.

As described above, when the first sub-connecting portion 121 and the second sub-connecting portion 122 are respectively disposed on the inner surfaces of the first outer connecting portion 301 and the inner connecting portion 302, and the third sub-connecting portion 110 is disposed on the outer surface of the rechargeable battery 100, the band assembly 300 can be freely moved while electrical conductivity between the first to third sub-connecting portions 121, 122, and 110 is maintained. Accordingly, the band assembly 300 according to the present disclosure can be easily applied to a wearable device.

The second electrode connecting portion 120 may include a fourth sub-connecting portion 221, a fifth sub-connecting portion 222, and a sixth sub-connecting portion 210.

The fourth sub-connecting portion 221 may be disposed on one of inner surfaces of the second outer connecting portion 303 that faces an electrode terminal of the rechargeable battery 100.

In addition, the fifth sub-connecting portion 222 may be disposed on an inner surface of the inner connecting portion 302. Specifically, the fifth sub-connecting portion 222 may be disposed on one of inner surfaces of the inner connecting portion 302 that faces the side wall of the rechargeable battery 100.

The fourth sub-connecting portion 221 and the fifth sub-connecting portion 222 may be, for example, linearly formed such that they are parallel to each other. In terms of efficiency, the fourth sub-connecting portion 221 and the fifth sub-connecting portion 222 may be disposed such that a distance therebetween is the shortest.

However, this is only an example, and the shape and thickness of the fourth sub-connecting portion 221 and the fifth sub-connecting portion 222 are not specifically limited as long as the first sub-connecting portion 121 and the second sub-connecting portion 122 can be electrically connected through the sixth sub-connecting portion 210 to be described below. Therefore, they may also be, for example, formed in the shape of a curve, a zigzag-shaped line, or a mixture thereof.

A thickness of the fourth sub-connecting portion 221 may be the same as that of the fifth sub-connecting portion 222, the thickness of the fourth sub-connecting portion 221 may be smaller than that of the fifth sub-connecting portion 222, and as shown in FIG. 4, the thickness of the fourth sub-connecting portion 221 may be greater than that of the fifth sub-connecting portion 222.

That is, the thickness of the fourth sub-connecting portion 221 may vary depending on a height of the rechargeable battery 100 that is disposed inside the outer connecting portions 301 and 303 and the inner connection portion 302, but it is not specifically limited thereto.

The sixth sub-connecting portion 210 is formed on an outer surface of the case of the rechargeable battery 100, and serves to electrically connect the fourth sub-connecting portion 221 and the fifth sub-connecting portion 222.

Specifically, the sixth sub-connecting portion 210 is disposed to at least partially contact the electrode terminal of the rechargeable battery 100. In addition, the sixth sub-connecting portion 210 may be formed according to an outer shape of the rechargeable battery 100, that is, a protruded shape of the electrode terminal and an outer shape of the case.

The widths, thicknesses, shapes, or the like of the fourth sub-connecting portion 221, the fifth sub-connecting portion 222, and the sixth sub-connecting portion 210 are not specifically limited, and may be freely modified as long as they are electrically connected to each other.

In addition, the fourth sub-connecting portion 221, the fifth sub-connecting portion 222, and the sixth sub-connecting portion 210 may be made of a material having electrical conductivity, and for example, may be formed of the same material as the case of the rechargeable battery 100, but they are not specifically limited thereto.

As described above, when the fourth sub-connecting portion 221 and the fifth sub-connecting portion 222 are respectively disposed on the inner surfaces of the first outer connecting portion 301 and the inner connecting portion 302, and the sixth sub-connecting portion 210 is disposed on the outer surface of the rechargeable battery 100, the band assembly 300 can be freely moved while electrical conductivity between the fourth to sixth sub-connecting portions 221, 222, and 210 is maintained. Accordingly, the band assembly 300 according to the present disclosure can be easily applied to a wearable device.

Figure 5:
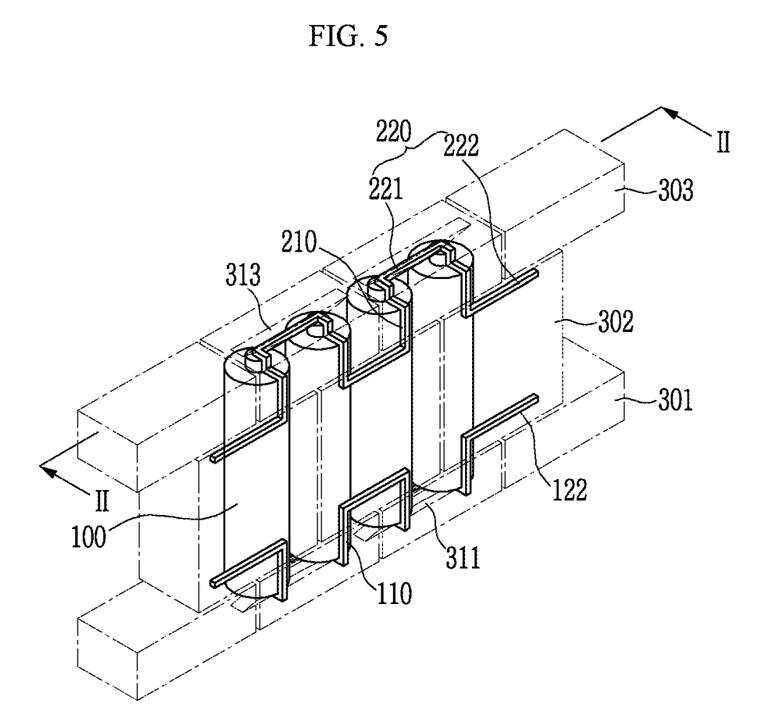
FIG. 5 is a schematic view of an internal connection structure of a part of a band assembly according to another exemplary embodiment of the present disclosure.
Figure 6:
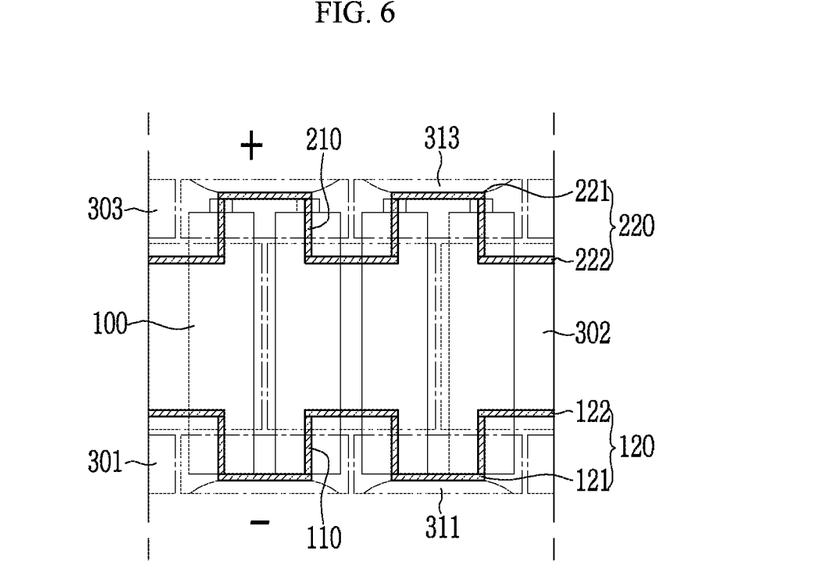
FIG. 6 is a partial cross-sectional view of FIG. 5 taken along the line II-II.

FIG. 5 is a schematic view of an internal connection structure of a part of a band assembly according to another exemplary embodiment of the present disclosure, and FIG. 6 is a partial cross-sectional view of FIG. 5 taken along the line II-II.

In FIGS. 5 and 6, for better understanding, first and second outer connecting portions 301 and 303 and an inner connecting portion 302 are indicated by dotted lines, and elements disposed inside of them are indicated by solid lines.

Referring to FIGS. 5 and 6, a band assembly 300 according to the current exemplary embodiment of the present disclosure may include first support portions 311 and 313 inside of at least one of the first and second outer connecting portions 301 and 303. In this case, the first support portions 311 and 313 may also be disposed on an inner surface of the first outer connecting portion 301 that faces a bottom surface of a case of a rechargeable battery 100, and may be disposed on an inner surface of the second outer connecting portion 303 that faces an electrode terminal. Alternatively, they may also be disposed on both the inner surface of the first outer connecting portion 301 and the inner surface of the second outer connecting portion 303.

The first support portions 311 and 313 may have a shape that protrudes toward the rechargeable battery 100. Accordingly, the first support portion 311 disposed inside the first outer connecting portion 301 may contact a first sub-connecting portion 121. The first support portion 313 disposed inside the second outer connecting portion 303 may contact a fourth sub-connecting portion 221.

The first supporting portions 311 and 313 serve to stably fix a plurality of rechargeable batteries 100 inside the band assembly 300 even when the band assembly 300 moves.

Specifically, since an internal space of the first and second outer connection portions 301 and 303, in which the rechargeable batteries 100 are accommodated, are mostly empty, the rechargeable batteries 100 can move as the band assembly 300 moves. However, as described above, when the first supporting portions 311 and 313 are included, the possibility of the rechargeable batteries 100 being twisted or moved can be significantly reduced, thereby further improving stability of the band assembly 300 according to the current exemplary embodiment of the present invention.

The first support portions 311 and 313 may be formed to protrude toward the rechargeable batteries 100 such that they stably fix the rechargeable batteries 100, and prevent the first sub-connecting portion 121 and/or the fourth sub-connecting portion 221 disposed on the first support portions 311 and 313 from being electrically disconnected. For example, as shown in FIG. 6, it may have a curved surface, or although not illustrated, may have a polygonal shape with a predetermined angle, or may have a spiral spring shape.

That is, the shapes of the first supporting portions 311 and 313 are not specifically limited as long as they support the rechargeable batteries 100 such that the rechargeable batteries 100 are not moved even if the band assembly 300 moves, and they prevent the first sub-connecting portion 121 and/or the fourth sub-connecting portion 221 from being electrically disconnected.

Accordingly, stability of the band assembly 300 can be improved when the first support portions 311 and 313 are included on the inner surface of at least one of the first and second outer connection portions 301 and 303.

The first supporting portions 311 and 313 may be formed of a material having electrical conductivity, and the kind of material is not specifically limited. Accordingly, since a first electrode and/or a second electrode of each of the rechargeable batteries 100 can be more tightly attached to the first sub-connecting portion 121 and/or the fourth sub-connecting portion 221 by the first support portions 311 and 313, electrical conductivity therebetween may also be improved.

In the current exemplary embodiment, other elements except for the first support portions 311 and 313 are the same as those described above, so a repeated description will be omitted.

Figure 7:
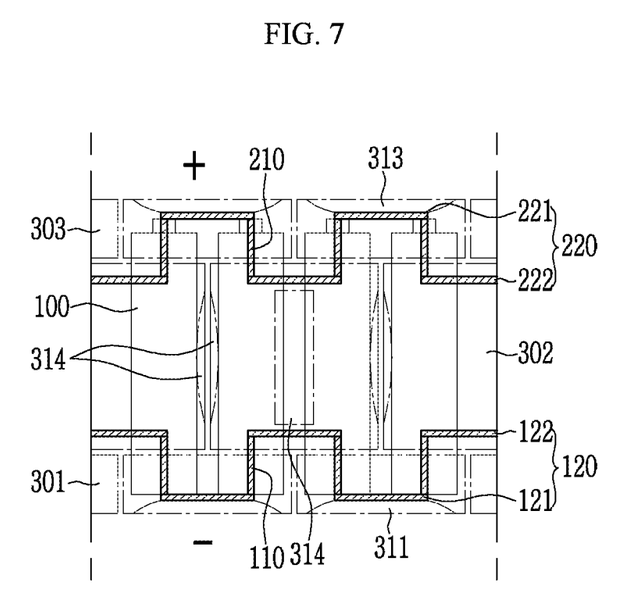
FIG. 7 is a partial cross-sectional view of a band assembly according to another exemplary embodiment of the present disclosure.

FIG. 7 is a partial cross-sectional view of a band assembly according to another exemplary embodiment of the present disclosure.

Referring to FIG. 7, a band assembly 300 according to the current exemplary embodiment of the present disclosure may include a second support portion 314 on an inner surface of an inner connecting portion 302.

In this case, the second support portion 314 may be disposed on one of inner surfaces that face a side wall of a rechargeable battery 100. Accordingly, as shown in FIG. 7, it may be disposed on a plurality of inner surfaces of the inner connection portion 302.

The second support portion 314 may have a shape that protrudes toward the sidewall of the rechargeable battery 100. Therefore, the second support portion 314 disposed inside the inner connection portion 302 may contact the side wall of the rechargeable battery 100.

The second support portion 314 serves to reliably hold a plurality of rechargeable batteries 100 inside the band assembly 300 even if the band assembly 300 moves.

Specifically, since an internal space of the inner connecting portion 302 in which the rechargeable battery 100 is accommodated is mostly empty, the rechargeable battery 100 can move as the band assembly 300 moves.

However, as described above, when the second support portion 314 is included, the possibility that the rechargeable battery 100 is twisted or moves can be significantly reduced, thereby further improving stability of the band assembly 300 according to the current exemplary embodiment of the present invention.

The second support portion 314 may be formed to protrude toward the side wall of the rechargeable battery, thereby stably fixing the rechargeable battery 100. For example, as shown in FIG. 7, it may have a curved surface or may have a polygonal shape having a predetermined angle, although not illustrated, or may have a spiral spring shape.

That is, the shape of the second support portion 314 is not specifically limited as long as it supports the rechargeable battery 100 such that the rechargeable battery 100 is not moved even if the band assembly 300 moves.

Accordingly, when the second support portion 314 is included on at least one of inner surfaces of the inner connecting portion 302 that faces the side wall of the rechargeable battery 100, stability of the band assembly 300 can be improved.

The second supporting portion 314 can be made of any material as long as it can perform the foregoing supporting function. For example, it may be made of a material having good elasticity without significantly increasing a weight of the band assembly 300.

For ease of description, FIG. 7 shows that both the first support portions 311 and 313 and the second support portion 314 are included, but the first support portions 311 and 313 formed on at least one of the inner surfaces of the first and second outer connecting portions 301 and 303 may not be included and only the second support portion 314 may be included.

In the current exemplary embodiment, except for the second support portion 314, the other elements are the same as those described above, and they will not be described herein.

Next, each rechargeable battery 100 included in the band assembly 300 will be described.

Figure 8:
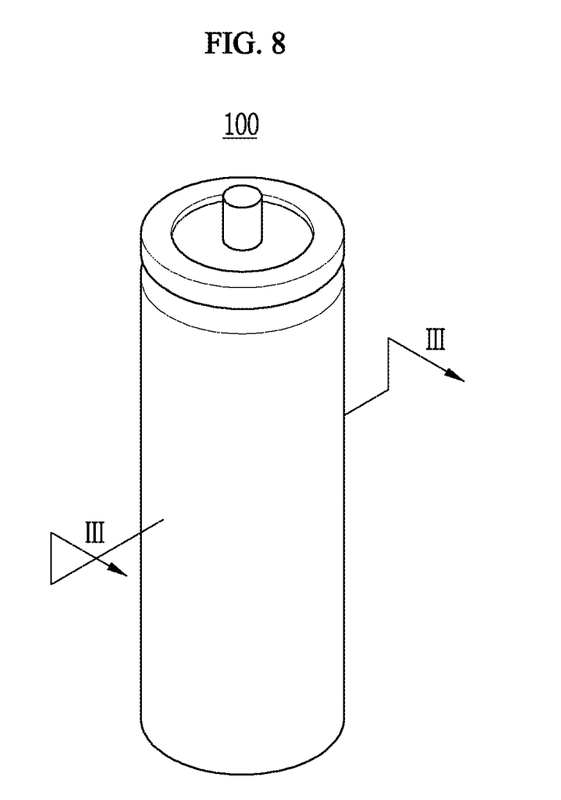
FIG. 8 is a perspective view of a rechargeable battery to be applied to FIG. 1.
Figure 9:
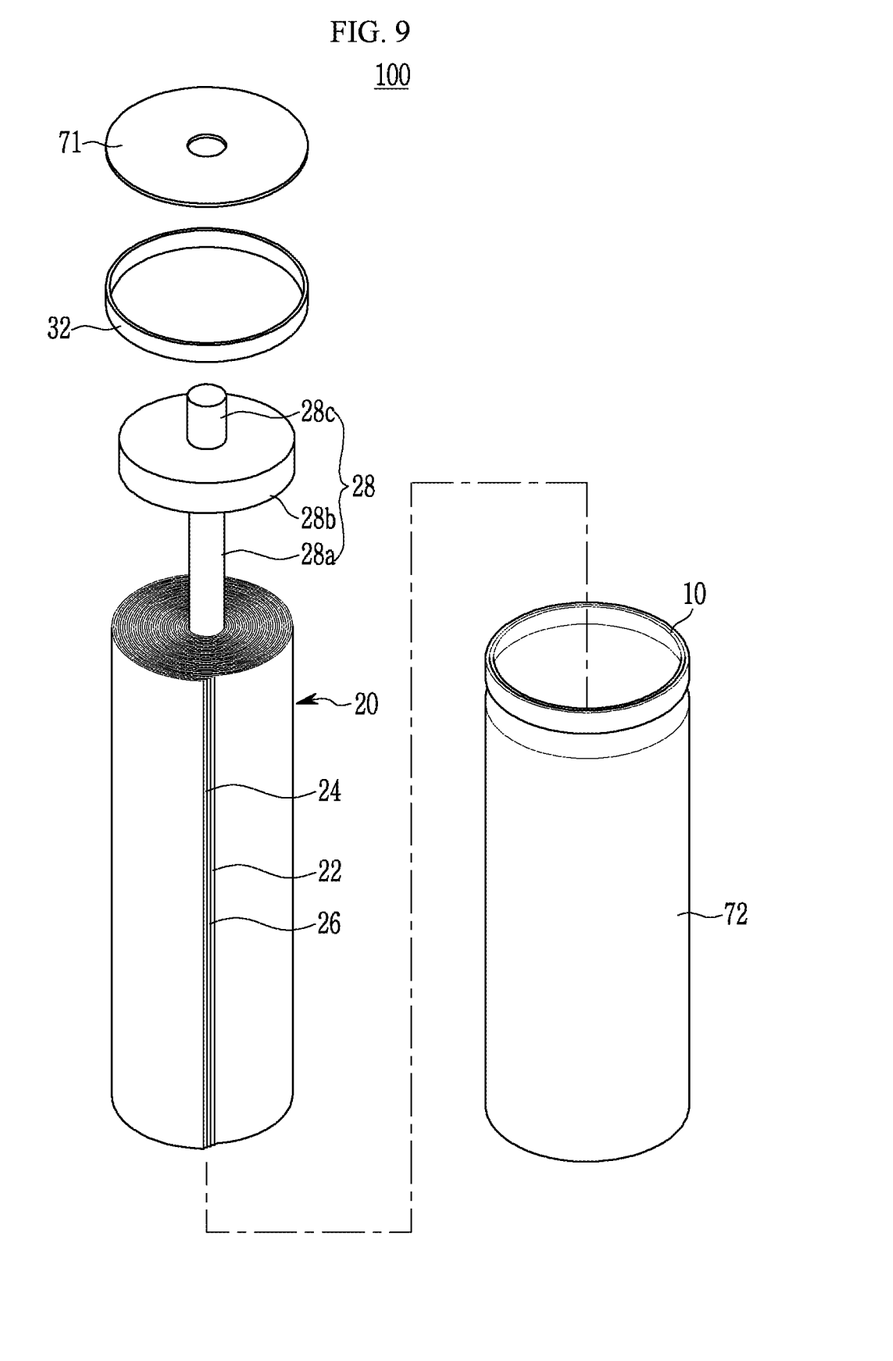
FIG. 9 is an exploded perspective view of the rechargeable battery of FIG. 8.
Figure 10:
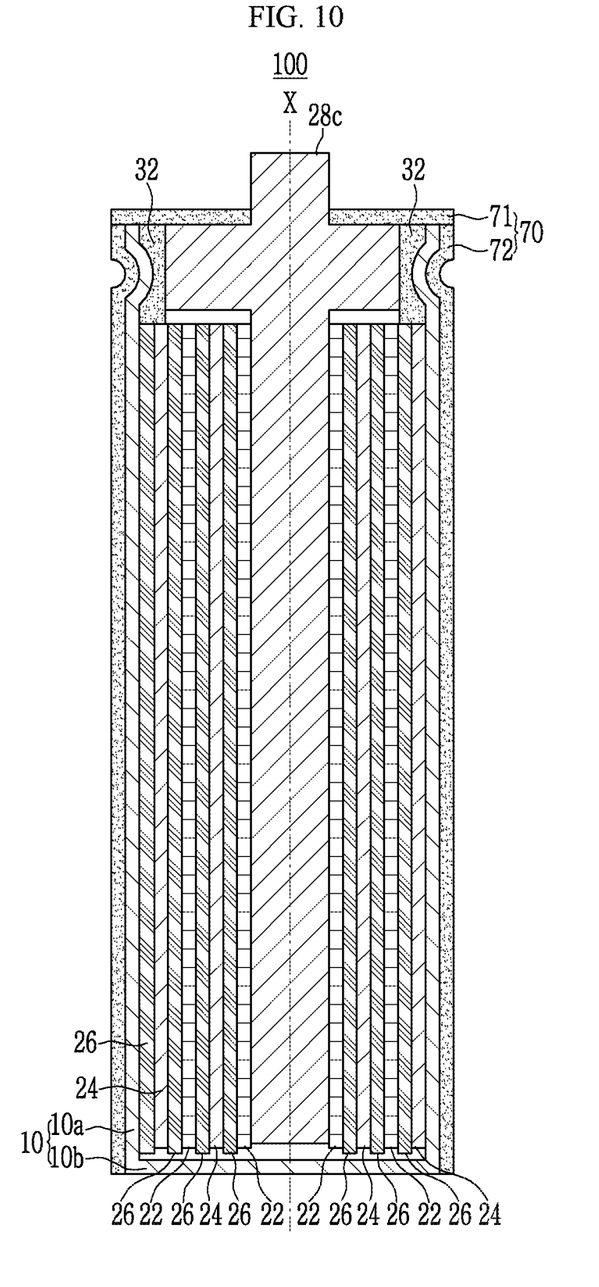
FIG. 10 is a cross-sectional view of FIG. 8 taken along the line III-III.

FIG. 8 is a perspective view of a rechargeable battery to be applied to FIG. 1, FIG. 9 is an exploded perspective view of the rechargeable battery of FIG. 8, and FIG. 10 is a cross-sectional view of FIG. 8 taken along the line III-Ill.

Referring to FIGS. 8 to 10, a rechargeable battery 100 included in a band assembly 300 may include an electrode assembly 20 and a case 10 for accommodating the electrode assembly 20.

In this case, the case 10 may be electrically connected to a second electrode 24 that is included in the electrode assembly 20. In addition, an electrode terminal 28c may be provided at one side of the case 10 where an opening of the case 10 is positioned, and may be electrically connected to a first electrode 22 which protrudes out of the case 10 and is included in the electrode assembly 20.

The case 10 accommodates the electrode assembly 20, it may be formed into a cylindrical shape with an opening at one side, a bottom surface 10b, and a side wall 10a, and it may be formed as a pin type having a diameter of several millimeters.

In addition, since the case 10 conducts electricity, a wire can be connected to a surface of the case 10 for electrical conduction without any additional terminal except for the electrode terminal 28c that protrudes from one side of the case 10 where the opening of the case 10 is positioned.

A plate 28b may be provided at the opening of the case 10, and a first insulating member 32 may be interposed therebetween to close and seal the opening. The first insulating member 32 may be disposed at part of the side wall 10b of the case 10 where it meets the opening of the case 10, and serves to electrically insulate the case 10 having conductivity from the electrode terminal 28c protruding from the opening of the case 10.

More specifically, the first insulating member 32 may be formed to enclose the side wall of the plate 28b. That is, the first insulating member 32 is disposed on a side that contacts a side surface of the plate 28b, and serves to electrically insulate the plate 28b from the case 10.

As described above, when the first insulating member 32 is disposed between the side wall of the plate 28b and the case 10 and is formed to enclose the side wall of the plate 28b, it is possible to minimize a size of the first insulating member 32 and to prevent a short circuit between the plate 28b and the case 10 having opposite polarities from being generated.

In addition, a second insulating member 70 is disposed outside of the case 10. The second insulating member 70 may include a first insulating portion 71 for enclosing a top surface of the exposed plate 28b, and a second insulating portion 72 that is connected to the first insulating portion 71 to enclose the side wall 10a of the case 10.

As described above, when the second insulating member 70 is formed to enclose the top surface of the plate 28b and the side wall 10a of the case 10, a short circuit between a third sub-connecting portion 110 and a sixth sub-connecting portion 210 can be prevented from being generated.

As described above, the third sub-connecting portion 110 is electrically connected to the bottom surface 10b of the case, and the sixth sub-connecting portion 210 is electrically connected to the electrode terminal 28c, so they have different polarities.

The rechargeable battery 100 includes the electrode assembly 20 in which charging and discharging is performed, and a center pin 28a that is disposed at a center of the electrode assembly 20 and that is integrally formed with the electrode terminal 28c.

Figure 11:
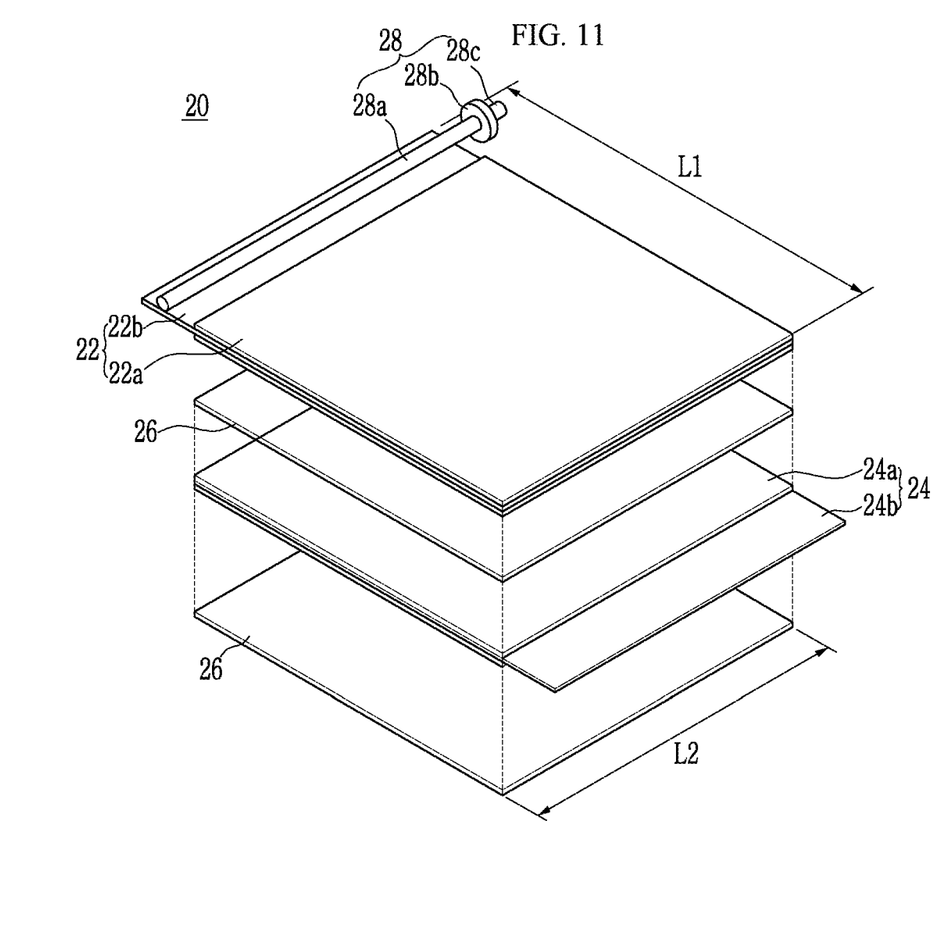
FIG. 11 is an exploded perspective view of an electrode assembly to be applied to FIG. 8.

FIG. 11 is an exploded perspective view of an electrode assembly to be applied to FIG. 8.

Referring to FIG. 11, a first electrode 22 and a second electrode 24 are sequentially stacked while interposing a separator 26 therebetween, and are then wound around a rod-shaped center pin 28a that is disposed at a center of an electrode assembly 20 and extends in a direction parallel to a rotation axis X, thereby forming the electrode assembly 20 in a jelly roll shape. More specifically, for example, the first electrode 22 and the second electrode 24 with the separator 26 interposed therebetween may be wound 2 to 5 times around a core. The number of windings can be appropriately selected according to a maximum diameter of a rechargeable battery 100 and thicknesses of the separator 26, the first electrode 22, and the second electrode 24.

The first electrode 22 and the second electrode 24 include electrode coated regions 22a and 24a where an active material is coated on a thin plate in the form of a metal foil, and electrode uncoated regions 22b and 24b where an active material is not coated thereon. In this case, the first electrode 22 may be a negative electrode, and may be formed by coating an active material such as a carbon-based active material on a thin metal plate made of copper or the like. The second electrode 24 may be a positive electrode, and may be formed by coating an active material such as a lithium-based active material on a thin metal plate made of aluminum or the like.

The separator 26 may be made of a porous thin film, or for example, may be made of a polyolefin-based resin. A horizontal width of the separator 26 may be formed shorter than horizontal widths L1 of the first electrode 22 and the second electrode 24. That is, the horizontal width of the separator 26 may be corresponded to a length of the first electrode coated region 22a or the second electrode coated region 24a excluding the electrode uncoated regions 22b and 24b. In addition, the separator 26 may be formed to have a vertical width which is equal to or greater than a vertical width L2 of the first electrode 22 and the second electrode 24, such that a short-circuit between an end portion of the first electrode 22 and an end portion of the second electrode 24 is not generated.

When the electrode assembly 20 is wound, the center pin 28a is connected to the uncoated region 22b of the first electrode 22 by welding and is then wound, and may be used as a first terminal of the rechargeable battery 100. More specifically, the electrode terminal 28c integrally formed with the center pin 28a functions as the first terminal. In addition, a plate 28b for closing and sealing an opening of a case 10 is combined to the center pin 28a to be disposed between the center pin 28a and the electrode terminal 28c, and as a result, the center pin 28a, the plate 28b, and the electrode terminal 28c may all have the same polarity.

In addition, the second electrode uncoated region 24b of the second electrode 24 may be exposed outside of the separator 26, and the exposed second electrode uncoated region 24b may contact an inner surface of the case 10 for electrical connection. Accordingly, the case 10 may function as a second terminal of the rechargeable battery.

As described above, the band assembly according to the present disclosure includes a pin type of rechargeable batteries, and when it is applied to a smartwatch, capacity of the battery may be improved.

While this disclosure has been described in connection with what is presently considered to be practical exemplary embodiments, it is to be understood that the disclosure is not limited to the disclosed embodiments, but, on the contrary, it is intended to cover various modifications and equivalent arrangements included within the spirit and scope of the appended claims.

REFERENCE SIGNS

100: rechargeable battery
300: band assembly
301, 303: outer connecting portions
301a: first fastening hole
303a: third fastening hole
302: inner connecting portion
302a: second fastening hole
311: 313: first support portions
314: second support portion

The invention claimed is:

1. A band assembly comprising:
a first outer connecting portion and a second outer connecting portion disposed to face each other, wherein the first outer connecting portion includes a first fastening hole and the second outer connecting portion includes a third fastening hole;
an inner connecting portion disposed between the first outer connecting portion and the second outer connecting portion, wherein the inner connecting portion includes a second fastening hole that corresponds to the first fastening hole and the third fastening hole; and
a rechargeable battery inserted into the first fastening hole, the second fastening hole, and the third fastening hole to connect the first outer connecting portion, the inner connecting portion, and the second outer connecting portion.

2. The band assembly of claim 1, wherein
the rechargeable battery includes:
an electrode assembly in which a first electrode and a second electrode are wound while interposing a separator therebetween;
a case configured to accommodate the electrode assembly, wherein the case is electrically connected to the second electrode; and
a center pin disposed at a center of the electrode assembly, wherein the center pin includes an electrode terminal, and the electrode terminal is electrically connected to the first electrode and protrudes out of the case.

3. The band assembly of claim 2, wherein
the band assembly includes a plurality of rechargeable batteries, and
the band assembly includes a first electrode connecting portion and a second electrode connecting portion that electrically connect each of the rechargeable batteries to a neighboring one of the rechargeable batteries.

4. The band assembly of claim 3, wherein
the first electrode connecting portion includes:
a first sub-connecting portion disposed on an inner surface of the first outer connecting portion;
a second sub-connecting portion disposed on an inner surface of the inner connecting portion; and
a third sub-connecting portion disposed on an outer surface at least one of the rechargeable batteries, wherein the third sub-connecting portion electrically connects the first sub-connecting portion and the second sub-connecting portion.

5. The band assembly of claim 4, wherein
the third sub-connecting portion has a bent shape, and directly contacts some of a surface of the case opposite to a surface thereof where the electrode terminal is disposed.

6. The band assembly of claim 3, wherein
the second electrode connecting portion includes:
a fourth sub-connecting portion disposed on an inner surface of the second outer connecting portion;
a fifth sub-connecting portion disposed on an inner surface of the inner connecting portion; and
a sixth sub-connecting portion disposed on an outer surface of at least one of the rechargeable batteries, where the sixth sub-connecting portion electrically connects the fourth sub-connecting portion and the fifth sub-connecting portion.

7. The band assembly of claim 6, wherein
the sixth sub-connecting portion has a bent shape and directly contacts at least some of the electrode terminal.

8. The band assembly of claim 2, wherein
at least one of the first outer connecting portion and the second outer connecting portion includes
a first support portion that protrudes toward the rechargeable battery from at least one of inner surfaces facing the rechargeable battery.

9. The band assembly of claim 2, wherein
the inner connecting portion includes
a second support portion that protrudes toward a side wall of the rechargeable battery from at least one of inner surfaces facing the side wall of the rechargeable battery.

10. The band assembly of claim 2, wherein
the rechargeable battery includes
a plate including a first insulating member, wherein the first insulating member is interposed between the plate and an opening of the case, closes and seals the opening of the case, and electrically separates the electrode terminal from the case.

11. The band assembly of claim 10, including
a second insulating member configured to enclose a side wall of the case and a top surface of the plate.

12. The band assembly of claim 2, wherein
the electrode terminal and the center pin are integrally formed.

* * * * *

UNITED STATES PATENT AND TRADEMARK OFFICE
CERTIFICATE OF CORRECTION

| | | |
|---|---|---|
| PATENT NO. | : 11,043,713 B2 | Page 1 of 1 |
| APPLICATION NO. | : 16/329181 | |
| DATED | : June 22, 2021 | |
| INVENTOR(S) | : Sol Choi et al. | |

It is certified that error appears in the above-identified patent and that said Letters Patent is hereby corrected as shown below:

In the Claims

Column 12, Line 8, Claim 4    Delete "surface",
                              Insert -- surface of --

Signed and Sealed this
Ninth Day of August, 2022

Katherine Kelly Vidal
*Director of the United States Patent and Trademark Office*